US008913590B2

(12) United States Patent
Fantini et al.

(10) Patent No.: US 8,913,590 B2
(45) Date of Patent: Dec. 16, 2014

(54) MANAGEMENT OF A HYBRID COMMUNICATION NETWORK COMPRISING A CELLULAR NETWORK AND A LOCAL NETWORK

(75) Inventors: Roberto Fantini, Turin (IT); Paolo Gallo, Turin (IT); Alfredo Ruscitto, Turin (IT)

(73) Assignee: Telecom Italia S.p.A., Milan (IT)

( * ) Notice: Subject to any disclaimer, the term of this patent is extended or adjusted under 35 U.S.C. 154(b) by 356 days.

(21) Appl. No.: 12/811,028

(22) PCT Filed: Dec. 28, 2007

(86) PCT No.: PCT/IT2007/000928
§ 371 (c)(1),
(2), (4) Date: Jun. 28, 2010

(87) PCT Pub. No.: WO2009/084051
PCT Pub. Date: Jul. 9, 2009

(65) Prior Publication Data
US 2010/0284388 A1 Nov. 11, 2010

(51) Int. Cl.
*H04W 4/00* (2009.01)
*H04W 48/18* (2009.01)
*H04W 40/08* (2009.01)
*H04W 40/12* (2009.01)
*H04W 72/12* (2009.01)
*H04W 28/18* (2009.01)
*H04L 29/08* (2006.01)
*H04L 5/00* (2006.01)
*H04W 28/02* (2009.01)

(52) U.S. Cl.
CPC .......... *H04W 48/18* (2013.01); *H04W 72/1226* (2013.01); *H04W 28/18* (2013.01); *H04L 67/32* (2013.01); *H04W 40/08* (2013.01); *H04L 5/006* (2013.01); *H04W 28/0236* (2013.01); *H04W 40/12* (2013.01)
USPC ............................ 370/332; 370/252; 370/322

(58) Field of Classification Search
None
See application file for complete search history.

(56) References Cited

U.S. PATENT DOCUMENTS 5,491,837 A * 2/1996 Haartsen .......................... 455/62
7,075,905 B2 * 7/2006 Chen et al. ..................... 370/318
(Continued)

FOREIGN PATENT DOCUMENTS

| EP | 1448011 A1 | 8/2004 |
| GB | 2346507 A | 8/2000 |
| WO | 2007/000181 A1 | 1/2007 |

OTHER PUBLICATIONS

International Search Report and Written Opinion dtd Sep. 29, 2008, PCT/IT2007/000928.
(Continued)

*Primary Examiner* — Jae Y Lee
*Assistant Examiner* — Andrew Oh
(74) *Attorney, Agent, or Firm* — Banner & Witcoff, Ltd.

(57) ABSTRACT

Disclosed herein is a method of managing a hybrid network including a cellular network and a local network wherein a number of dual mode mobile terminals are connectable to a base station of the cellular network through a direct cellular link and are also connectable, one with respect to the other, through the local network by a radio access technique. The method includes the steps of computing a cost associated with a direct connection established along a path (A) extending from a selected mobile terminal to the base station through the cellular link only, computing a cost ($C_{cg}$) associated with at least one indirect connection established along a path (B) extending from the selected mobile terminal to the base station through the local network and the cellular network, and selecting for data transmission the path that minimizes the cost.

20 Claims, 2 Drawing Sheets

(56) References Cited

U.S. PATENT DOCUMENTS

| | | | |
|---|---|---|---|
| 2003/0125069 A1* | 7/2003 | Lee | 455/522 |
| 2004/0023650 A1 | 2/2004 | Ohta et al. | |
| 2004/0039792 A1 | 2/2004 | Nakanishi | |
| 2004/0047327 A1* | 3/2004 | Chen | 370/342 |
| 2004/0246935 A1* | 12/2004 | Joshi et al. | 370/338 |
| 2004/0258024 A1* | 12/2004 | Tiedemann et al. | 370/332 |
| 2005/0122931 A1* | 6/2005 | Kado | 370/328 |
| 2005/0174979 A1* | 8/2005 | Chen et al. | 370/342 |
| 2005/0281290 A1* | 12/2005 | Khandekar et al. | 370/500 |
| 2006/0215556 A1* | 9/2006 | Wu et al. | 370/230 |
| 2007/0153729 A1* | 7/2007 | Alapuranen | 370/329 |
| 2007/0153986 A1* | 7/2007 | Bloebaum et al. | 379/45 |
| 2007/0155406 A1* | 7/2007 | Dowling et al. | 455/456.1 |
| 2007/0157307 A1* | 7/2007 | Katoh et al. | 726/14 |
| 2007/0161407 A1* | 7/2007 | Hovers et al. | 455/562.1 |
| 2007/0217367 A1* | 9/2007 | Lee et al. | 370/335 |
| 2007/0218942 A1* | 9/2007 | Khan et al. | 455/553.1 |
| 2007/0223452 A1* | 9/2007 | Semper | 370/352 |
| 2007/0291663 A1* | 12/2007 | Dixit et al. | 370/254 |
| 2007/0291722 A1* | 12/2007 | Lee | 370/338 |
| 2008/0005351 A1* | 1/2008 | Neugebauer et al. | 709/238 |
| 2008/0039016 A1* | 2/2008 | Bonta et al. | 455/41.2 |
| 2008/0107069 A1* | 5/2008 | Wu et al. | 370/329 |
| 2008/0108305 A1* | 5/2008 | Lin et al. | 455/11.1 |
| 2008/0108369 A1* | 5/2008 | Visotsky et al. | 455/455 |
| 2008/0123584 A1* | 5/2008 | Behrendt et al. | 370/315 |
| 2008/0285499 A1* | 11/2008 | Zhang et al. | 370/315 |
| 2008/0285500 A1* | 11/2008 | Zhang et al. | 370/315 |
| 2008/0285504 A1* | 11/2008 | Lin | 370/319 |
| 2009/0052374 A1* | 2/2009 | Takeda et al. | 370/328 |
| 2009/0097433 A1* | 4/2009 | Shen et al. | 370/315 |
| 2009/0157378 A1* | 6/2009 | Boldyrev et al. | 703/22 |
| 2010/0214930 A1* | 8/2010 | Hu et al. | 370/241 |

OTHER PUBLICATIONS

H. Luo et al, "UCAN: A Unified Cellular and Ad-Hoc Network architecture", MobiCom '03, Sep. 14-19, 2003, San Diego, CA, 15 pages.

Choi et al., "Profit-Based Routing for Multihop Coverage Extension in Wireless Networks," Wireless Personal Communications, 2007; vol. 42, pp. 465-478.

Dijkstra, "A Note on Two Problems in Connexion with Graphs," Numerische Mathematik, 1959, vol. 1, pp. 269-271.

Sipilä et al., "Estimation of Capacity and Required Transmission Power of WCDMA Downlink Based on a Downlink Pole Equation," IEEE, 2000, pp. 1002-1005.

Luo H et al.: "UCAN: A Unified Cellular and Ad-Hoc Network Architecture", Proceedings of the Ninth Annual International Conference on Mobile Computing and Networking (MOBICOM 2003); [Annual International Conference on Mobile Computing and Networking], San Diego, CA, USA, vol. Conf. 9, Sep. 14, 2003, pp. 353-367, XP001186730, DOI: 10.1145/938985.939021 ISBN: 978-1-58113-753-8.

EP Office Communication mailed Oct. 11, 2012, EP Appln. 07 870 584.5-1249.

* cited by examiner

MANAGEMENT OF A HYBRID COMMUNICATION NETWORK COMPRISING A CELLULAR NETWORK AND A LOCAL NETWORK

CROSS REFERENCE TO RELATED APPLICATIONS:

This is a U.S. National Phase Application under 35 U.S.C. §371 of International Application No. PCT/IT2007/00928, filed Dec. 28, 2007, which was published Under PCT Article 21(2), the entire contents of which are incorporated herein by reference.

TECHNICAL FIELD OF THE INVENTION

The present invention relates in general to communication systems, and in particular to the management of a hybrid communication network comprising a cellular network and a local network.

BACKGROUND ART

In recent years, wireless data networks have made significant progress, with both the world-wide upgrade of cellular networks to support wide-area data access, and the widespread deployment of IEEE 802.11 based wireless local area networks (WLAN).

Those two technologies have significant differences. First of all, they provide different coverage: cellular networks can use large cells and through the support of mobility offer nation-wide service continuity, while wireless local area networks are limited to localized and relatively small hot spots.

Second, data rates offered from the two networks are different, with cellular networks supporting data rates relatively low, in the order of hundreds of kilobits, and wireless local area networks providing data rates significantly higher, reaching up to 54 Mbps in the particular case of IEEE 802.11a and IEEE 802.11g standards.

In particular, while cellular networks operate in infrastructure mode, with fixed base stations serving mobile users, WLAN can operate also in ad-hoc mode, where clients relay packets over multi-hop wireless links. All those differences make wireless LAN and cellular networks complementary technologies that can satisfy different necessities of the users.

For this reason, in the last few years a certain interest arose in the market for so called dual-mode mobile handsets, that provide both cellular (2G/3G) and wireless LAN connectivity. The availability of this kind of handsets offers the opportunity of combining the two technologies and leverages the advantages of each other.

It is therefore felt the need of efficiently integrating the above two technologies in a hybrid communication network enabling both cellular and WLAN connectivity.

An interesting solution for the integration of the cellular system with WLAN operating in ad-hoc mode is described in the paper "UCAN: A Unified Cellular and Ad-Hoc Network architecture" (authors: H. Luo, R. Ramjee, P. Sinha, L. Li, S. Lu), where mobile terminals with both 3G cellular link and IEEE 802.11-based peer-to-peer links are taken into account.

The 3G base station forwards packets for destination clients with poor channel quality to proxy clients with better channel quality. The proxy clients then use an ad-hoc network composed of other mobile terminals employing IEEE 802.11 wireless links to forward the packets to the appropriate destinations, thereby improving cell throughput.

The discovery of the proxy clients is accomplished through on-demand protocols that exploit the 3G infrastructure to reduce complexity and improve reliability. The solution also takes into account that mobile terminals acting as relays should be somehow rewarded for the energy consumption that they experience when they forward data of other users.

A secure crediting system is proposed, where proxy and relay clients are awarded credits that can be redeemed in the form of shared revenue, or increased priority in the future call admission, packet scheduling and/or network traffic engineering.

Moreover, in paper "Profit-Based Routing for Multihop Coverage Extension in Wireless Networks" (authors Y.-J. Choi, J. H. Jun and S. Bahk) relaying nodes receive a revenue R from the operator as a reward for their energy consumption.

Assuming that the energy consumption represents a cost $C_i$ for the user i, the proposed scheme takes into account a path in the ad-hoc network only if the profit for all the terminals that act as relay is positive, i.e. if $R > C_i$ for all i, and if the total cost experienced by the operator, that is the sum of all the revenues R paid to the relaying nodes, is lower than the revenue gained from the established connection.

Under this constraint, the profit-based routing scheme presented in the aforementioned work selects the path that allows reaching the base station with the minimum number of hops, so that the amount of revenues paid from the operator is as small as possible.

The assumption behind this solution is that the ad-hoc network will be used only when it is not possible to directly connect to the base station: when a direct connection is not available the shortest path that allows reaching a terminal in the base station coverage will be selected, given that the cost paid from both the operator and the relaying nodes is not greater than their revenue.

OBJECT AND SUMMARY OF THE INVENTION

Regarding the above paper "ULAN: A Unified Cellular and Ad-Hoc Network architecture" (by H. Luo, R. Ramjee, P. Sinha, L. Li, S. Lu), the Applicant has observed that the proxy discovery algorithm, described in this document, does not take into account the cost that the usage of the ad-hoc network represents for an operator, who should pay some credits to all the relaying nodes as reward for the energy consumption.

In the above document, the ad-hoc network is considered a free resource and exploited as much as possible in order to reach the node that has the best cellular link condition, regardless of how much that would cost in terms of credits for relaying terminals.

The Applicant has noted that the problem of the cost represented by the ad-hoc links is addressed in paper "Profit-Based Routing for Multihop Coverage Extension in Wireless Networks" (by Y.-J. Choi, J. H. Jun and S. Bahk). This work takes into account the cost of the ad-hoc links, which can not be considered a free resource since the operator should somehow reward relaying node for their energy consumption. However, this work takes into account only the cost of the ad-hoc network, without considering the advantages that relaying towards a gateway mobile terminal can provide by means of a better cellular channel link. In that sense, so far the costs of the ad-hoc links or of the cellular links have always been considered separately.

The proposed invention aims to exploit the capability of dual-mode terminals in a hybrid network providing both cellular and WLAN connection in order to increase the capacity, coverage and the quality of service offered by the cellular network by taking into account also the cost of the local network usage.

This aim is achieved by the present invention that relates to a method of managing a hybrid network comprising a cellular network and a local network wherein a number of dual mode mobile terminals are connectable to a base station of the cellular network through direct cellular links and are also connectable, one with respect to the other, through the local network by means of a radio access technique. The method comprises: computing a cost associated with a direct connection established along a path extending from a selected mobile terminal to the base station through a cellular link only; computing a cost associated with at least one indirect connection established along a path extending from the selected mobile terminal to said base station through the local network and the cellular network; and selecting for data transmission one path based on the computed costs.

BRIEF DESCRIPTION OF THE DRAWINGS

For a better understanding of the present invention, preferred embodiments, which are intended purely by way of example and not to be construed as limiting, will now be described with reference to the attached drawings, wherein.

DETAILED DESCRIPTION OF PREFERRED EMBODIMENTS OF THE INVENTION

The following description is presented to enable a person skilled in the art to make and use the invention. Various modifications to the embodiments will be readily apparent to those skilled in the art, and the generic principles herein may be applied to other embodiments and applications without departing from the scope of the present invention. Thus, the present invention is not intended to be limited to the embodiments shown, but is to be accorded the widest scope consistent with the principles and features disclosed herein and defined in the attached description and claims.

Figure 1:
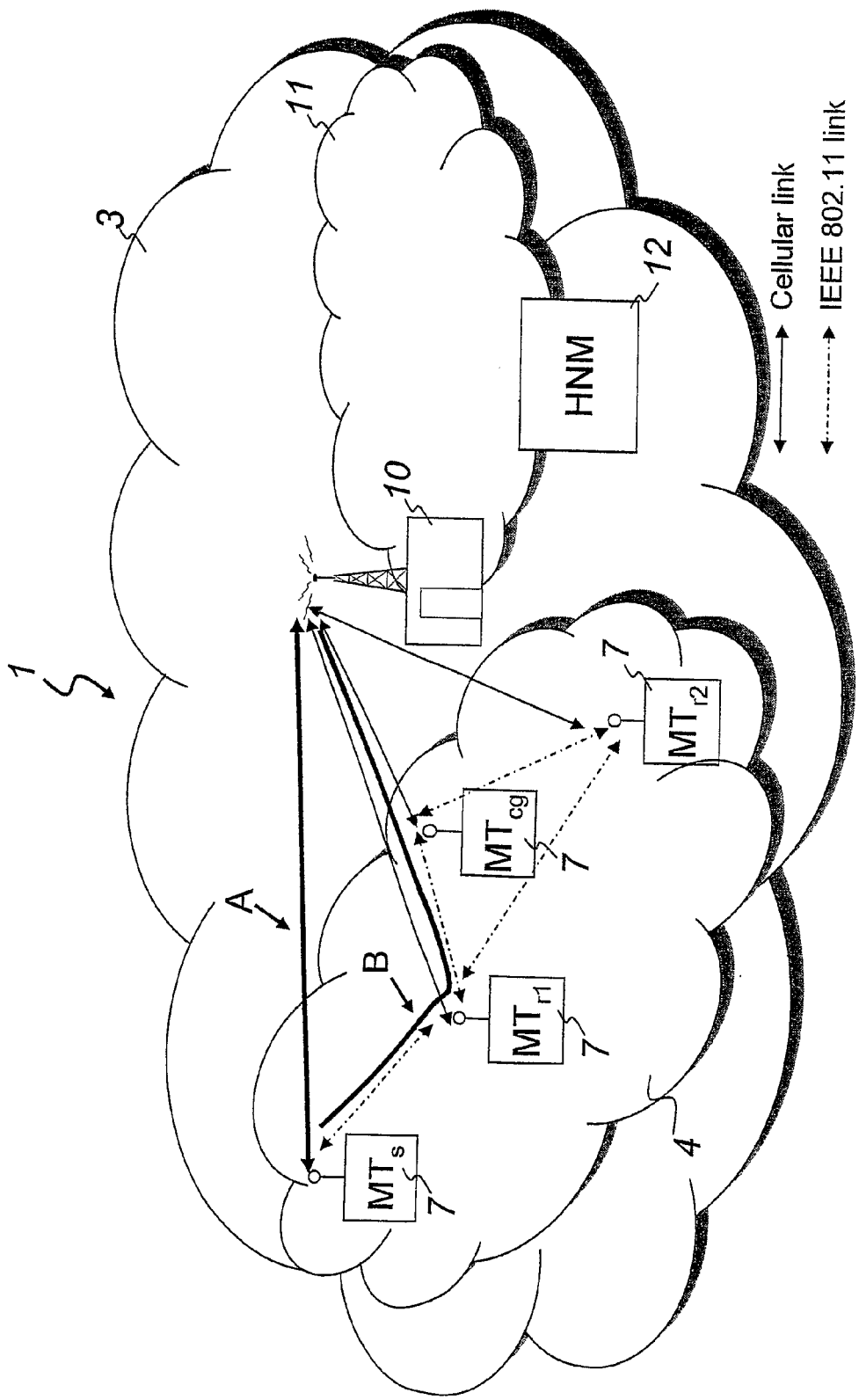
FIG. 1 represents schematically a preferred embodiment of the present invention.

With reference to FIG. 1, numeral 1 indicates a hybrid network according to the present invention.

The hybrid network 1 comprises a cellular network 3 (of a known type, shown schematically) and a local ad-hoc network 4 (of a known type) comprising a number of dual mode mobile terminals (MTs) 7 (of a known type). Conveniently, dual mode mobile terminals 7 provide wireless connectivity through, for example, a UMTS receiver and a WLAN apparatus.

Dual mode terminals 7 are connected directly to a base station 10 in the infrastructure 11 of the cellular network 3 through a cellular link (shown by means of a full line in FIG. 1) and are also connected, one with respect to the other, through the local network 4 by means of a radio access technique (the connection is shown by means of a dotted line), for example according to the standard IEEE 802.11.

In the local network 4, mobile terminals 7 act as relays and forward data received from adjacent mobile terminals 7 to other adjacent mobile terminals 7. Mobile terminals 7 also act as gateway nodes towards the cellular network 3, so that other mobile terminals 7 in the local network 4 can access the cellular network 3 through the gateway node also referred to as gateway mobile terminal.

According to one embodiment of the present invention, a centralized hybrid network manager (HNM) 12 is provided, such a centralized hybrid network manager 12 being conveniently placed in the cellular network 3. The centralized hybrid network manager 12 may be located, for example, in the node controlling a certain number of base stations 10 (usually referred to as Radio Network Controller or Base Station Controller) or, alternatively, in each base station 10.

As it will be clear in the following of the description, the centralized hybrid network manager 12 manages the communication of the dual mode mobile terminals 7, on the basis of an algorithm that decides the path for connecting dual mode terminals 7 with the base station 10.

When a mobile terminal 7 requests to initiate a data connection with the cellular network 3, the above mobile terminal 7 starts the cellular link, enabling the connection with the base station 10, and contacts the centralized hybrid network manager 12.

The centralized hybrid network manager 12 then checks, based on an established rule of the algorithm, whether it is more convenient to establish the connection between mobile terminal 7 and cellular network 3:

directly through the cellular link only (this direct connection is indicated with the direct path "A" in FIG. 1); or indirectly through the local network 4 (this indirect connection is indicated with the indirect path "B" in FIG. 1); i.e. using local network 4 in order to contact a gateway mobile terminal ($MT_{cg}$) 7 in good cellular link condition with the base station 10, i.e. a dual mode mobile terminal 7 having a connection with the cellular network 3 with a high quality of service (QoS).

Each dual mode mobile terminal 7 periodically performs (for example every a certain integer number of frames of the cellular link) measurement of the quality of the direct connection along path A, for example in terms of one or a combination of the following:

1) throughput

2) UTRA Carrier Received Signal Strength Indicator (RSSI) measured at the input of the particular mobile terminal 7. UTRA Carrier RSSI is defined by 3GPP as the received wide band power, including thermal noise and noise generated in the receiver, within the bandwidth defined by the receiver pulse shaping filter. The reference point for the measurement shall be the antenna connector of the mobile terminal; and/or 3) the received power level of some reference channels (as for example the Common Pilot Channel CPICH in the case of UMTS radio access interface) transmitted by the base station 10 to the mobile terminal 7 in question. This measure is defined by 3GPP as the CPICH Received Signal Code Power (RSCP), i.e. the received power on one code measured on the Primary CPICH. The reference point for the RSCP shall be the antenna connector of the mobile terminal.

Eventually, the QoS of the direct connection can be determined measuring also or alternatively the CPICH Ec/No, defined by 3GPP as the received energy per chip divided by the power density in the band. The CPICH Ec/No is identical to the ratio between CPICH RSCP and UTRA Carrier RSSI. When determined, the above measurements are sent to the centralized hybrid network manager 12, together with the measurements available in the base station 10 (such as the power employed by the base station for the transmission of the dedicated channels together with the cell load).

On the other side, each dual mode mobile terminal 7 periodically performs measurement of the quality of the links with the neighbouring dual mode mobile terminals 7, for example in terms of air-time cost. The air-time cost depends on the quality of the radio channel between dual mode terminals 7, in terms of packet error rate and cardinality (i.e. number of bits per symbol) of the employed modulation, and it is proportional to the energy consumption required by the transmission on the link connecting a couple of dual mode terminals 7. The greater is the link quality, the faster and more reliable is the connection, the lower is the air-time cost. Upon determination, the above costs are sent to the centralized hybrid network manager 12. The determination of the quality of the indirect connection through the local network 4 may be determined by the centralized hybrid network manager 12 by establishing a cost that takes into consideration the overall effect of the different links involved in the connection.

In fact different connections may be established through local network 4, each connection being characterized by a respective path and by a respective cost that depends on the number and the quality of the established connections.

It should be noted that the quality of the indirect link depends on the number of hops in the indirect path B. In fact, each hop increases the overall delay and reduces the available bandwidth of the connection because the same packet is transmitted multiple times along the local network 4 so that longer paths should basically have worst characteristic with respect to shorter paths.

It is therefore clear that the term "cost" refers to a technical parameter identifying a technical penalization (i.e. a "cost parameter"), and does not necessarily imply an economic value, even if economic implications may be involved.

The centralized hybrid network manager 12 periodically collects the measures performed by dual mode mobile terminals 7 with the neighbouring dual mode mobile terminals 7 to build a weighted graph representing the local network 4 made by the dual mode mobile terminals 7, where nodes represent the positions of the dual mode mobile terminals 7, and the weights are the air-time cost of the links between adjacent dual mode mobile terminals 7.

The centralized hybrid network manager 12 may also provide other functions such as security (authentication, privacy) and billing.

The collection of the measurements can be accomplished by the centralized hybrid network manager 12 both in a reactive or pro-active way, i.e. the dual mode mobile terminals 7 can be instructed to report their measurements periodically, so that the centralized hybrid network manager 12 always has an updated map of the current local network 4 status, or measurements can be collected only when a new connection has to be established.

The above weighted graph can be used by the centralized network manger 12 together with the Dijkstra algorithm (the algorithm is well known, see for instance E. W. Dijkstra, *A note on two problems in connection with graphs*, Numerische Mathematik, N.1, 1959, S. 269-271), to find in the local network 4 the paths having a minimum overall air-time cost from mobile terminal to all the other mobile terminals (denoted in FIG. 1 as $MT_{r1}$, $MT_{r2}$, $MT_{cg}$).

The Dijkstra algorithm may also take into consideration the maximum number NH of hops that may be allowed in the local network 4.

More specifically, mobile terminal 7 may require a specific level of QoS and consequently the central hybrid network manger 12 may accordingly decide to limit the maximum number $N_H$ of hops that are acceptable for the indirect path B in the local network 4, so that the requested level of QoS will be in any case provided.

Accordingly, the Dijkstra algorithm finds a number of candidate paths each extending in the local network 4 between a mobile terminal MT and a gateway mobile terminal $MT_{cg}$ in contact with the base station 10 through the cellular link 3, each candidate path comprising a number of hops minor than NH and having the lower air-time cost possible.

For the above candidate paths, the centralized hybrid network manager 12 calculates a total cost that takes into consideration four different factors:
 the quality of the cellular link between the candidate gateway node $MT_{cg}$ of the candidate path and the base station 10;
 the quality of all links involved in the candidate path along the local network 4;
 the number $N_H$ of hops of the candidate path along the local network 4; and
 the amount of power $P_{avail}$ that is available in the base station 10 in the current cell load condition.

Therefore, given the available power $P_{avail}$ in the base station 10, the cost function for the path that goes from $MT_s$ to $MT_{cg}$ through at most $N_H$ hops along the ad-hoc network 4, denoted in the following as $MT_s \Leftrightarrow MT_{s+1}$, $MT_{s+1} \Leftrightarrow MT_{s+2} \ldots MT_{cg-1} \Leftrightarrow MT_{cg}$, and then from $MT_{cg}$ to the base station 10 through the cellular link, is expressed as:

$$C_{cg} = f_c(Q_{MT_s \Leftrightarrow MT_{(s+1)}}, \ldots, Q_{MT_{(cg-1)} \Leftrightarrow MT_{cg}}, Q_{3G}(MT_{cg}), N_H, P_{avail}) \quad (1)$$

where $Q_{MT_i \Leftrightarrow MT_j}$ depends on the quality of the IEEE 802.11 link between the nodes $MT_i$ and $MT_j$, and can be for example represented by the associated air-time cost $Ca_{i \Leftrightarrow j}$, while $Q_{3G}(MT_{Cg})$ is the quality of the cellular link associated with the candidate gateway node $MT_{cg}$, and can be for example represented by the power transmitted by the base station 10 $P_{TX}(MT_{cg})$ in the cellular link between the candidate gateway node $MT_{cg}$ and the base station 10.

The amount of power $P_{TX}$ that is transmitted essentially depends on the path loss of the propagation channel between the base station 10 and the considered mobile terminal MTcg, on the target Signal to Interference Ratio (SNR) associated with the service requested by the candidate gateway node, and on the cell load $\eta_{DL}$, as it is shown in "Estimation of Capacity and Required Transmission Power of WCDMA Downlink Based on a Downlink Pole Equation" (K. Sipila, Z.-C. Honkasalo, J. Laiho-Steffens, A. Wacker, from Nokia):

$$P_{TX} = P_N \cdot SNR \cdot v \cdot PathLoss \cdot \frac{1}{1 - \eta_{DL}} \quad (2)$$

where $P_N$ is the thermal noise power, v is the channel activity factor, and $\eta_{DL}$ takes into account the load of the cell, being equal to 1 when the cell is overloaded, and decreasing down to zero as the cell unloads.

A simple cost function $f_c$ can be, for example, obtained through a weighted combination of the above mentioned terms:

$$C_{cg} = \frac{W_{Pow}}{P_{avail}} \cdot P_{TX} \bigg|_{dBm}(MT_{cg}) + W_{Ca} \cdot \sum_{N_H} Ca_{i \Leftrightarrow j} + W_{N_H} \cdot N_H \quad (3)$$

where:
 $C_{cg}$ represents said cost function;
 $W_{Pow}$, $W_{Ca}$, $W_{N_H}$ represent different settable weights;

$P_{avail}$ represents the power available in the base station 10 in the current cell load ($\eta_{DL}$) condition;

$P_{TX}$ ($MT_{cg}$) represents the power transmitted by the base station 10 in the cellular link between the candidate gateway mobile terminal $MT_{cg}$ and the base station 10;

$N_H$ represent the number of hops of the candidate path; and $Ca_{i\leftrightarrow j}$ represents the quality of the link between the mobile terminals $MT_i$ and $MT_j$ and may be represented by the associated air-time cost.

However it should be clear that other choices are possible, without departing from the scope of the present invention.

The value of the coefficients $W_{Pow}$, $W_{Ca}$, $W_{N_H}$ that are used to weight every term of the expression is chosen so that it is possible to give more relevance to one term or the others, thus making more important to save transmission power on the cellular link ($W_{Pow}$), or not to involve too many terminals in the ad-hoc network ($W_{N_H}$), or to ensure that the quality of the ad-hoc network is high enough that relaying terminals do not waste too much power ($W_{Ca}$).

Since saving transmission power on the cellular link is much more important when the cell load is high, a weight coefficient $W_{Pow}/P_{avail}$ is proposed that is inversely proportional to the available power in the base station. With this choice, when the cell is loaded and the available power is near to zero, the weight of the cellular link is high and whichever path that allows saving some power of the transmitting base station of the cellular network will be selected, whatever is the price associated with the ad-hoc link.

On the other hand, when the load of the cellular network is low, the cost of the cellular link is low, and the advantage in terms of saved power provided by a better cellular link should be significant in order to overcome the cost of the mesh.

Therefore, the coefficient of the combination, $W_{Pow}$, $W_{Ca}$, $W_{N_H}$, can be selected in order to give more relevance to the cost of the cellular link, of the ad-hoc network, or to the number of hops in the ad-hoc network, depending on the particular strategies of the operator. In particular an operator can assign more importance to a given factor by increasing the value assumed by the correspondent weight.

The centralized hybrid network manager 12 computes for all the candidate gateway node the overall cost along indirect path B and also knows the cost associated with the link along the direct path A.

In other words, in order to select the best gateway node, the costs of the direct cellular link and of the local network 4 is jointly evaluated and then the cost are compared.

Based on the above comparison, by choosing the connection associated with the lowest cost, it is decided if it is, more reasonable to use directly the cellular network 3 or use the local network 4 and then the cellular network 3; in the later case, the method provides an indication about which dual mode terminal $MT_{cg}$ 7 should be selected as a gateway node towards the cellular network 3.

It should be noted that in a heavily loaded cell the operator may be wilful to pay the extra cost represented by the local network 4, since relaying traffic through the ad-hoc network may be the only way to deliver the service to the end-user. On the other hand, when the cell is only lightly loaded the opportunity to use the local network 4 may be less attractive.

If the local network 4 is used, the centralized hybrid network manager 12 chooses the gateway node MTcg that provides the minimum cost Ccg; the centralized hybrid network manager 12 after having taken its decision, then signals to all the dual mode mobile terminals 7 involved in the selected path its decision, so that, all the relay mobile terminals 7, and the gateway mobile terminal MTg know where they should forward packets generated by dual mode terminal MTs.

Therefore, exploiting the local network 7, one mobile dual mode terminal MTs 7 can reach another dual mobile terminal MTg 7 that has a better cellular link with the base station 10, and, using this terminal as a gateway node, connect to the base station 10 in more favourable conditions.

Figure 2:
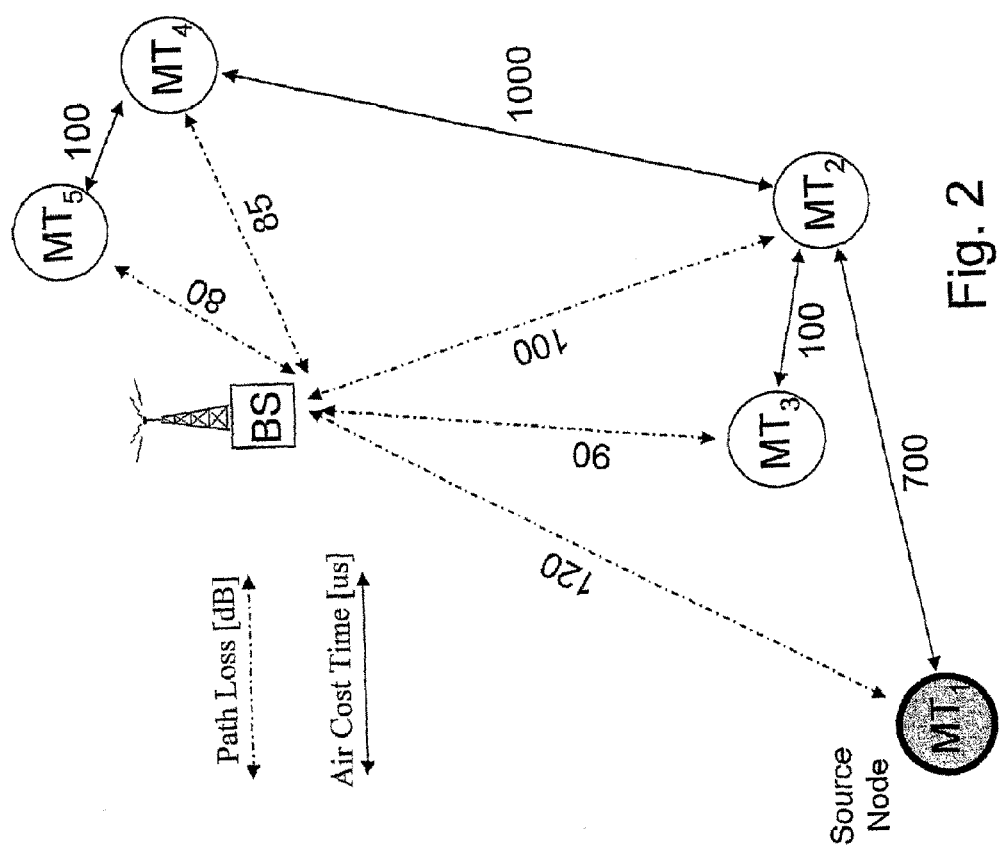
FIG. 2 is an example of a cost computation performed in the present invention.

FIG. 2 provides an example of a hybrid network where costs (700, 100, 1000, 100) associated with connections (the connections are shown with full line) between dual mode mobile terminals 7 are shown. In FIG. 2, costs (120, 90, 100, 85, 80) associated with connections through the cellular link (these connections are shown with dotted line) are also shown.

In the enclosed Table 1, Table 2 and Table 3 are reported some examples that, referring to the particular topology in FIG. 2, show how different cell loads, and different choices for the weights $W_{Pow}$, $W_{Ca}$, $W_{N_H}$, lead to the selection of different gateway mobile terminals.

In the example a base station 10 with a maximum transmitted power $P_{MAX}$ equal to 10 Watt has been considered, and a 64.4 kbps data service has been taken into account, so that the target SNR is −14 dB and the activity factor $\nu$ is 1.

Moreover the power available at the transmitting base station is given by $P_{avail} = P_{MAX} \cdot (1-\eta_{DL})$ and the thermal noise power $P_N$ at the mobile terminals is assumed equal to −100 dBm (these are typical values observable in a cellular network).

Finally, in FIG. 2 the path loss is expressed in dB and the air-time cost in microseconds.

It should be noted that in Table 1 the cost of the ad-hoc network is given exclusively by the number of hops in the path, which corresponds to the case in which the operator decides to pay a fixed revenue to users involved in the ad-hoc network.

In particular the air-time cost of each hop is neglected by setting the parameter $W_{Ca}$ equal to zero.

From the left side of Table 1, it is possible to observe that by increasing the cell load $\eta_{DL}$ from 0.5 to 0.9 the centralized hybrid network manager 12 chooses the paths requiring the minimum transmitted power by the base station while, from the right side of Table 1, it is possible to observe that, for a fixed value of cell load, by increasing the value of $W_{N_H}$, i.e. the parameter related to the degradation of the QoS due to the number of hop, the paths requiring a smaller number of hop are selected.

TABLE 1

| Parameters $\eta_{DL}$ | $W_{Pow} = 1$ [W] $W_{Ca} = 0$ [us$^{-1}$] $W_{NH} = 4$ Selected MT Gateway | Parameters $W_{NH}$ | $W_{Pow} = 1$ [W] $W_{Ca} = 0$ [us$^{-1}$] $\eta_{DL} = 0.8$ Selected MT Gateway |
|---|---|---|---|
| 0.9 | MT$_5$ | 2 | MT$_5$ |
| 0.8 | MT$_4$ | 4 | MT$_4$ |
| 0.7 | MT$_4$ | 6 | MT$_4$ |
| 0.6 | MT$_2$ | 8 | MT$_2$ |
| 0.5 | MT$_1$ | 10 | MT$_1$ |

In Table 2, it is considered the case where the revenue is directly proportional to the amount of battery consumed by users (i.e. to the air-time cost) and the number of hops does not influence the cost of the ad-hoc network by setting the parameter $W_{N_H}$ equal to zero. In particular in the left side of table 2. it is possible to observe that, for a fixed value of $W_{Ca}$, by increasing the cell load $\eta_{DL}$ from 0.5 to 0.9 the centralized hybrid network manager 12 chooses the paths requiring the minimum transmitted power by the base station while from the right side of table 2 it is possible to observe that, for a fixed value of cell load, by increasing the value of $W_{Ca}$, i.e. the importance of the air-time cost and therefore of the power consumption of the mobile phones, the paths with a small value of air-time cost are selected.

TABLE 2

| Parameters $\eta_{DL}$ | $W_{Pow} = 1$ [W] $W_{Ca} = 5/1000$ [us$^{-1}$] $W_{NH} = 0$ Selected MT Gateway | Parameters $W_{Ca}$ [1/us] | $W_{Pow} = 1$ [W] $W_{NH} = 0$ $\eta_{DL} = 0.8$ Selected MT Gateway |
|---|---|---|---|
| 0.9 | MT$_5$ | 2/1000 | MT$_5$ |
| 0.8 | MT$_3$ | 3/1000 | MT$_3$ |
| 0.7 | MT$_3$ | 6/1000 | MT$_3$ |
| 0.6 | MT$_3$ | 9/1000 | MT$_3$ |
| 0.5 | MT$_1$ | 11/1000 | MT$_1$ |

Finally, Table 3 presents the case where the operator pays both a fixed and a variable part to the users, so that the fixed part can compensate the amount of battery consumed for signalling, while the variable part compensate for the effective amount of battery consumed in data forwarding. Also in this case it is possible to observe that, by increasing the cell load $\eta_{DL}$ from 0.5 to 0.9, the centralized hybrid network manager 12 chooses the paths requiring the minimum transmitted power by the base station.

TABLE 3

| Parameters $\eta_{DL}$ | $W_{Pow} = 1$ [W] $W_{Ca} = 2/1000$ [us$^{-1}$] $W_{NH} = 2$ MT Gateway |
|---|---|
| 0.9 | MT$_5$ |
| 0.8 | MT$_3$ |
| 0.7 | MT$_3$ |
| 0.6 | MT$_2$ |
| 0.5 | MT$_1$ |

The invention claimed is:

1. A method of managing a hybrid network including a cellular network and a local network, wherein a number of dual mode mobile terminals are connectable to a base station of the cellular network through direct cellular links and are also connectable to one another by a radio access technique to form the local network, the method comprising:
   computing a first cost associated with a direct connection established along a first path extending from a selected mobile terminal to the base station through a cellular link of the cellular network only;
   computing a second cost associated with at least one indirect connection established along a second path extending from the selected mobile terminal to the base station through at least one of the other dual mode mobile terminals and the cellular network, wherein computing the second cost comprises:
      computing a quality of a second cellular link of the cellular network between the base station and the at least one of the other dual mode mobile terminals;
      computing an amount of power that is available in the base station in a current load condition of a cell in the cellular network; and
      computing at least one of:
         a quality of all links involved in the local network along the second path; and
         a number of hops in the local network along the second path,
   wherein the second cost is computed based on a cost function where at least one settable weight is attributed to at least one of the quality of all links involved in the local network along the second path, the amount of power that is available in the base station in the current load condition of the cell in the cellular network, and the number of hops in the local network along the second path, and wherein computing the second cost comprises adjusting the at least one settable weight based on the current load condition of the cell in the cellular network; and
   selecting for data transmission one of the first and second paths based on the first and second computed costs.

2. The method of claim 1, wherein the step of selecting for data transmission one of the first and second paths comprises the step of selecting for data transmission the path that minimizes the cost.

3. The method of claim 1, wherein computing the first cost comprises computing one or a combination of the following for the direct connection:
   received Signal Strength Indicator measured at an input of the selected mobile terminal;
   throughput; and
   received power level of reference channels transmitted by the base station to the selected mobile terminal.

4. The method of claim 1, further comprising:
   determining a number of different candidate paths extending along the local network from the selected mobile terminal to respective candidate gateway mobile terminals communicating with the base station through the cellular network;
   defining for each candidate path a respective cost; and
   selecting one candidate path based on the cost of the selected candidate path.

5. The method of claim 4, wherein determining the number of different candidate paths is based on an algorithm that takes into consideration at least one of the following:
   finding paths having a minimum overall air-time cost from the selected mobile terminal to all of the other candidate gateway mobile terminals; and
   the maximum number of hops that are allowed in the local network along the second path.

6. The method of claim 5, wherein the algorithm is the Dijkstra algorithm.

7. The method of claim 1, wherein computing the quality of all links involved in the local network along the second path comprises computing an air-time cost for each of the links involved in the local network along the second path.

8. The method of claim 1, wherein a-the cost function for computing the second cost associated with the at least one indirect connection is expressed as:

$$C_{cg} = \left. \frac{W_{Pow}}{P_{avail}} \cdot P_{TX} \right|_{dBm} (MT_{cg}) + W_{Ca} \cdot \sum_{N_H} Ca_{i \Leftrightarrow j} + W_{N_H} \cdot N_H$$

wherein:
   $C_{cg}$ represents the cost function for computing the second cost;
   $W_{Pow}$, $W_{Ca}$, $W_{NH}$ represent different settable weights, including the at least one settable weight;
   $P_{avail}$ represents the power available in the base station in the current load condition of the cell in the cellular network;

$P_{TX}$, ($MT_{cg}$) represents a power transmitted by the base station in the cellular link between the at least one of the other dual mode mobile terminals and the base station;

$N_H$ represents the number of hops of the second path; and $Ca_{i\leftrightarrow j}$ represents a quality of the link between mobile terminals $MT_i$, and $MT_j$ and is represented by an associated air-time cost.

9. The method of claim 1, wherein the at least one settable weight is attributed to the amount of power that is available in the base station in the current load condition of the cell in the cellular network, the method further comprising:

in response to determining to increase an importance of saving transmission power of the second cellular link, increasing the at least one settable weight.

10. A hybrid network comprising:

a cellular network;

a local network comprising a number of dual mode mobile terminals connectable to one another by a radio access technique, each one of the dual mode mobile terminals also being connectable to a base station of the cellular network through a respective direct cellular link; and a hybrid network manager configured for:

computing a first cost associated with a direct connection established along a first path extending from a selected mobile terminal to the base station through a cellular link of the cellular network only;

computing a second cost associated with at least one indirect connection established along a second path extending from the selected mobile terminal to the base station through at least one of the other dual mode mobile terminals and the cellular network, wherein computing the second cost comprises:

computing a quality of a second cellular link of the cellular network between the base station and the at least one of the other dual mode mobile terminals;

computing an amount of power that is available in the base station in a current load condition of a cell in the cellular network; and computing at least one of:

a quality of all links involved in the local network along the second path; and a number of hops in the local network along the second path, wherein the second cost is computed based on a cost function where at least one settable weight is attributed to at least one of the quality of all links involved in the local network along the second path, the amount of power that is available in the base station in the current load condition of the cell in the cellular network, and the number of hops in the local network along the second path, and wherein computing the second cost comprises adjusting the at least one settable weight based on the current load condition of the cell in the cellular network; and selecting for data transmission one of the first and second paths based on the first and second computed costs.

11. The hybrid network of claim 10, wherein the at least one settable weight is attributed to the amount of power that is available in the base station in the current load condition of the cell in the cellular network, and wherein the hybrid network manager is further configured for:

in response to determining to increase an importance of saving transmission power of the second cellular link, increasing the at least one settable weight.

12. A method comprising:

configuring a network manager to manage connections between a plurality of dual mode mobile terminals and a base station in a hybrid network having a cellular network and a local network;

determining a first cost to directly connect a mobile terminal of the plurality of mobile terminals to the base station using the cellular network and without using the other mobile terminals of the plurality of mobile terminals;

determining a second cost to indirectly connect the mobile terminal to the base station using at least one of the other mobile terminals and the cellular network, wherein determining the second cost comprises:

determining a quality of a cellular link of the cellular network between the base station and the at least one of the other dual mode mobile terminals;

determining an amount of power that is available in the base station in a current load condition of a cell in the cellular network; and determining at least one of:

a quality of the connection between the mobile terminal and the at least one of the other mobile terminals; and a number of hops between the mobile terminal and the base station for the indirect connection, wherein the second cost is computed based on a cost function where at least one settable weight is attributed to at least one of the quality of the connection between the mobile terminal and the at least one of the other mobile terminals, the amount of power that is available in the base station in the current load condition of the cell in the cellular network, and the number of hops between the mobile terminal and the base station for the indirect connection, and wherein computing the second cost comprises adjusting the at least one settable weight based on the current load condition of the cell in the cellular network; and based on the first cost and the second cost, selecting one of the direct connection and the indirect connection for data transmissions between the mobile terminal and the base station.

13. The method of claim 12, wherein determining the quality of the connection between the mobile terminal and the at least one of the other mobile terminals includes determining an air-time cost for a link between the mobile terminal to the at least one of the other mobile terminals.

14. The method of claim 12, wherein the quality of the connection between the mobile terminal and the at least one of the other mobile terminals is based on a packet error rate and a number of bits per symbol of a modulation technique used for the connection between the mobile terminal and the at least one of the other mobile terminals.

15. The method of claim 12, wherein determining the first cost includes determining at least one of or a combination of the following for the direct connection:

a received Signal Strength Indicator measured at an input of the mobile terminal, throughput, and received power level of reference channels transmitted by the base station to the mobile terminal.

16. The method of claim 12, wherein:

determining the first cost includes determining at least one of or a combination of a received Signal Strength Indicator measured at an input of the mobile terminal, throughput, and received power level of reference channels transmitted by the base station to the mobile terminal.

17. The method of claim 12, wherein the local network includes a wireless local area network (WLAN) and the cellular network does not include a wireless local area network (WLAN).

18. The method of claim 17, wherein the wireless local area network comprises an IEEE 802.11 network.

19. The method of claim 12, wherein the at least one settable weight is attributed to the amount of power that is available in the base station in the current load condition of the cell in the cellular network, the method further comprising:

in response to determining to increase an importance of saving transmission power of the cellular link of the cellular network between the base station and the at least one of the other dual mode mobile terminals, increasing the at least one settable weight.

20. The method of claim 12, wherein the at least one settable weight comprises at least a first settable weight attributed to the quality of the connection between the mobile terminal and the at least one of the other mobile terminals, a second settable weight attributed to the amount of power that is available in the base station in the current load condition of the cell in the cellular network, and a third settable weight attributed to the number of hops between the mobile terminal and the base station for the indirect connection, and wherein adjusting the at least one settable weight based on the current load condition of the cell in the cellular network comprises increasing or decreasing the first settable weight.

* * * * *